Patented June 9, 1925.

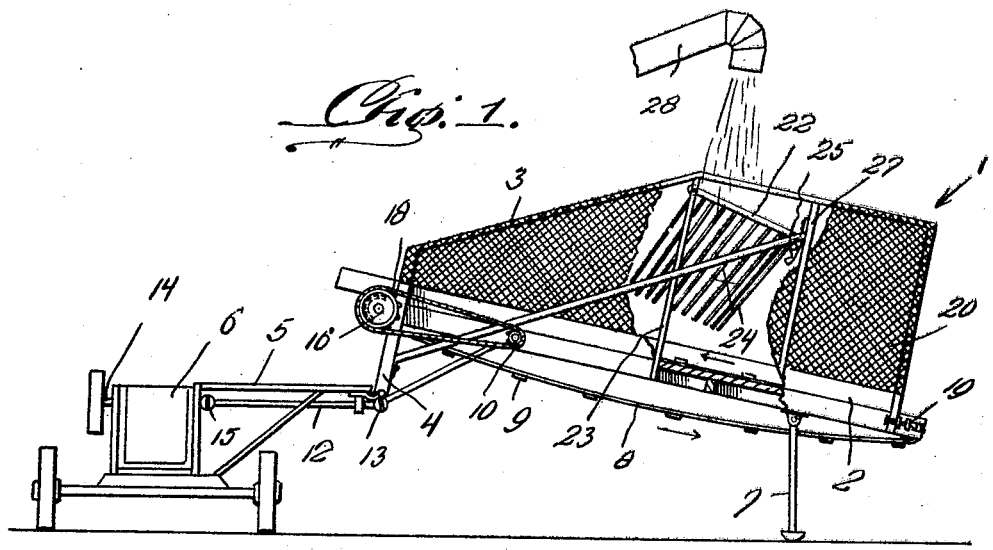
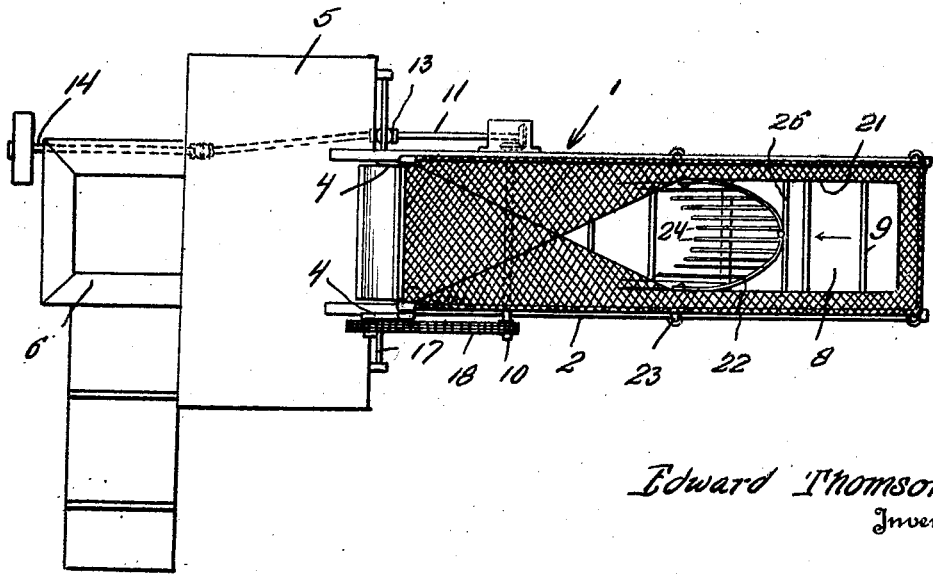

1,541,199

UNITED STATES PATENT OFFICE.

EDWARD THOMSON, OF ASHLEY, ILLINOIS.

FEEDING ATTACHMENT FOR HAY PRESSES.

Application filed October 22, 1924. Serial No. 745,221.

*To all whom it may concern:*

Be it known that I, EDWARD THOMSON, a citizen of the United States, residing at Ashley, in the county of Washington and State of Illinois, have invented certain new and useful Improvements in a Feeding Attachment for Hay Presses, of which the following is a specification.

This invention relates to a feeding attachment for hay presses and has for its principal object to provide a simple and efficient means whereby the hay which is discharged through the blower pipe of a threshing machine may be delivered to the feeding platform of a hay press.

One of the important objects of the present invention is to provide a device of the above mentioned character wherein the fine particles of hay will be separated during the feeding of the hay from the blower pipe of a threshing machine to a hay press, the attachment being of such construction as to prevent the hay from being blown away during the feeding thereof through the attachment.

A further object of the invention is to provide a device of the above mentioned character which may be readily and easily set up in position for use with a hay press, the device further being adapted to be readily disassembled and carried on the feeding platform of the hay press when not in use.

A still further object of the invention is to provide a device of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this specification and in which like numerals designate like parts throughout the same:

Figure 1 represents a side elevation of the device embodying my invention with parts broken away and showing the same in an operative position, and Figure 2 is a top plan view thereof.

In the drawing wherein for the purpose of illustration is shown the preferred embodiment of my invention, the numeral 1 designates generally the hay feeding attachment embodying my invention and the same comprises a substantially rectangular frame, the forward end thereof being cut away as illustrated at 3. Extending downwardly from the forward end of the frame are the supporting legs 4, the same being adapted for engagement with the outer longitudinal edge of the feeding platform 5 of a suitable hay press 6, the latter being of any well known construction. The rear end of the frame is adapted to be supported off of the ground by means of the supporting legs 7 which are pivotally secured at their upper ends to the bottom of the rear portion of the frame, it being understood of course that the legs are arranged adjacent each side of the frame and the purpose of pivotally securing the same to the frame is to permit the legs to be swung upwardly to an inoperative position when the attachment is not in use. Further, the legs are of such height as to cause the frame to have its forward end inclined upwardly when in an operative position as is clearly illustrated in Figure 1.

An endless conveyor belt 8 is arranged in the bottom of the frame 2 and secured on the belt at spaced intervals are the slats 9, the same extending transversely across the belt. The endless belt is adapted to be trained over a pair of rollers provided at the respective ends of the frame and the endless conveyor is adapted to be actuated by providing a transversely extending shaft 10 in the frame 2 adjacent the forward end thereof, the latter having a beveled gear on one end thereof meshing with a suitable beveled gear provided on the outer end of a driven shaft 11 in the manner clearly illustrated in Figure 2. The driven shaft 11 is in turn connected to a similar driven shaft 12 through the medium of a universal joint 13 and the shaft 12 is in turn connected to the drive shaft 14 of the hay press 6 through the medium of a universal joint 15. The opposite end of the shaft 10 has provided thereon a sprocket wheel which is in alignment with a sprocket wheel 16 carried on the outer end of the transversely extending shaft 17 which supports the roller at the forward end of the frame over which the endless conveyor belt travels and a sprocket chain 18 is trained over the aligning sprocket wheel whereby the drive shaft of the hay press is employed for actuating the endless conveyor. Any suitable belt tightening means such as is shown generally at 19 may be employed for taking up the slack in the belt. The forward end of the endless conveyor will be disposed over the outer side of the feeding platform 5 as clearly illustrated in the drawing.

The sides and respective ends of the frame 2 are covered with fine wire mesh such as is shown at 20 as is also the major portion of the sloping forward end of the top so as to provide an opening 21 in the top of the frame as clearly illustrated in Figure 2. The purpose of covering the top of the frame in a manner as above described will hereinafter be more fully set forth. A substantially U-shaped member 22 is arranged within the frame and the free ends of the arms thereof are pivotally supported to the vertical members 23 which are provided at the intermediate portions of the sides of the frame, the U-shaped member being pivotally supported adjacent the top of the vertical members 23.

Extending downwardly from the U-shaped member 22 and carried thereby are the parallel spaced rods 24 any number of which may be provided as is desired. The purpose of these rods will also hereinafter be more fully described. The U-shaped member is adapted to be supported in any desired adjusted position by providing a toothed member 25 which engages the crown portion of the U-shaped member 22. The toothed member 25 is supported on a transversely extending bar or rod 26 intermediate the ends thereof, the latter being supported by the vertical members 27 provided at the sides of the frame.

The U-shaped member 22 with the rods 24 extending downwardly therefrom is positioned directly below the discharge end of the blower pipe 28 of any well known type of threshing machine and it is readily apparent that when the hay with the blast of air is discharged from the blower pipe 28, the same will enter the feeder and separator through the opening 21 provided in the top thereof where the hay will strike the rods 24, the latter acting as a guide to assist in feeding the hay forwardly into the reduced portion of the frame and at the same time checking the draft yet permitting the fine particles of the hay and the blast of air to pass through the rods as well as through the fine wire mesh screen covering the sides and ends of the frame. The hay will become lodged in the forward end of the frame and the endless conveyor belt 8 will feed the hay forwardly onto the feeding platform 5 from which the hay is delivered to the hay press 6 in the well known manner. The fine wire mesh screening over the forward end of the top of the frame will also act as a check for the draft and prevent the hay from being blown outwardly of the screened frame.

The provision of a device of the above mentioned character, enables the same to be readily and easily attached in position for use in connection with hay presses, and when in use, the fine particles of hay as well as any other foreign substance will be separated from the hay before the latter is delivered to the hay press for baling. When not in use, the device may be readily detached from the hay press and may be carried on the platform 5 to facilitate the transportation thereof.

While I have shown the preferred embodiment of my invention, it is to be understood that various changes in the size, shape and arrangement of parts may be resorted to without departing from the spirit of the invention and the scope of the appended claims.

Having thus described the invention, what I claim is:—

1. An attachment for the feeding platform of a hay press comprising a frame, wire mesh covering the sides, ends and the forward end portion of the top of the frame, an endless conveyor in the bottom of the frame cooperating at its forward end with the platform, guide means in the frame below the inlet formed in the top of the frame, said guide means comprising a U-shaped member supported in the top of the frame below the inlet opening, and rods extending downwardly from the U-shaped member in parallel spaced relation.

2. An attachment for the feeding platform of a hay press comprising a substantially rectangular frame, supporting means therefor, wire mesh covering the sides, the ends and the top of the frame in such a manner as to provide an inlet opening in the rear portion of the top, an endless conveyor in the bottom of the frame cooperating at its forward end with the platform, means in the frame for deflecting the movement of the hay entering the inlet in the top of the frame toward the forward end of the frame comprising a U-shaped member, and a plurality of downwardly extending rods secured at their upper ends to the U-shaped member in parallel spaced relation.

3. An attachment for the feeding platform of a hay press comprising a substantially rectangular frame, supporting means therefor, wire mesh covering the sides, the ends and the top of the frame in such a manner as to provide an inlet opening in the rear portion of the top, an endless conveyor in the bottom of the frame cooperating at its forward end with the platform, means in the frame for deflecting the movement of the hay entering the inlet in the top of the frame toward the forward end of the frame comprising a U-shaped member, a plurality of downwardly extending rods secured at their upper ends to the U- shaped member in parallel spaced relation, and means for adjusting the U-shaped member.

4. An attachment for the feeding platform of a hay press comprising a substantially rectangular frame, supporting means therefor, wire mesh covering the sides, the ends and the top of the frame in such a manner as to provide an inlet opening in the rear portion of the top, an endless conveyor in the bottom of the frame cooperating at its forward end with the platform, means in the frame for deflecting the movement of the hay entering the inlet in the top of the frame toward the forward end of the frame comprising a U-shaped member, a plurality of downwardly extending rods secured at their upper ends to the U-shaped member in parallel spaced relation, the free ends of the arms of the U-shaped member being pivotally supported on the frame, and a toothed member cooperating with the crown portion of the U-shaped member for holding the same in an adjusted position.

In testimony whereof I affix my signature.

EDWARD THOMSON.